United States Patent [19]

Sweezy

[11] Patent Number: 4,775,924

[45] Date of Patent: Oct. 4, 1988

[54] INVERTER COMMUTATION FAILURE PREVENTION METHOD AND APPARATUS

[75] Inventor: George A. Sweezy, New Berlin, Wis.

[73] Assignee: Asea Power Systems, Inc., New Berlin, Wis.

[21] Appl. No.: 20,038

[22] Filed: Feb. 27, 1987

[51] Int. Cl.[4] .................. H02H 7/122; H02H 3/36
[52] U.S. Cl. ............................. 363/51; 363/58
[58] Field of Search .............. 363/35, 51, 58, 96, 363/137

[56] References Cited

U.S. PATENT DOCUMENTS

| | | | |
|---|---|---|---|
| 3,745,375 | 7/1973 | Huruse | 307/231 |
| 4,016,468 | 4/1977 | Graf | 318/434 |
| 4,028,607 | 6/1977 | Watanabe | 363/51 |
| 4,218,728 | 8/1980 | Chambers et al. | 363/54 |
| 4,218,729 | 8/1980 | Chambers | 363/54 |
| 4,346,432 | 8/1982 | Gurr | 363/58 |
| 4,455,598 | 6/1984 | Andre | 363/87 |
| 4,480,283 | 10/1984 | Kahkipuro et al. | 361/76 |
| 4,490,780 | 12/1984 | Nondahl | 363/87 |
| 4,499,534 | 2/1985 | Schnetzka et al. | 363/129 |
| 4,532,583 | 7/1985 | Nemoto | 363/58 |
| 4,571,535 | 2/1986 | Gyugyi | 323/211 |
| 4,586,121 | 4/1986 | Gilliam | 363/87 |

FOREIGN PATENT DOCUMENTS 68276 6/1981 Japan .................... 363/58

OTHER PUBLICATIONS

HVDC System Control—Asea, 1984 (Jan.).
Transmission Line Relaying Using Positive and Negative Sequence Currents and Voltages, by Mathews et al., presented to Texas A&M Relay Conference, College Station, Tex., Apr. 1981.

Primary Examiner—William H. Beha, Jr.
Attorney, Agent, or Firm—Fred Wiviott

[57] ABSTRACT

A control for an inverter operable for converting direct voltage and current to alternating voltage and current. The inverter includes a plurality of electrical valves each operable to conduct current in a single direction upon the application of a positive voltage in the forward direction and the receipt of a trigger pulse. The control provides successive trigger pulses for commutating the current between successive valves at predetermined electrical firing angles and includes a voltage-time area calculating circuit for calculating the maximum permissible firing angle which will permit successful commutation. An inverter commutation failure prevention circuit is coupled to the alternating current network for detecting abnormal voltage conditions and for producing a control signal functionally related to any deviation in the alternating voltage from the expected voltage condition. The control is responsive to the control signal for reducing the electrical angles of the trigger pulses provided to the valves.

42 Claims, 3 Drawing Sheets

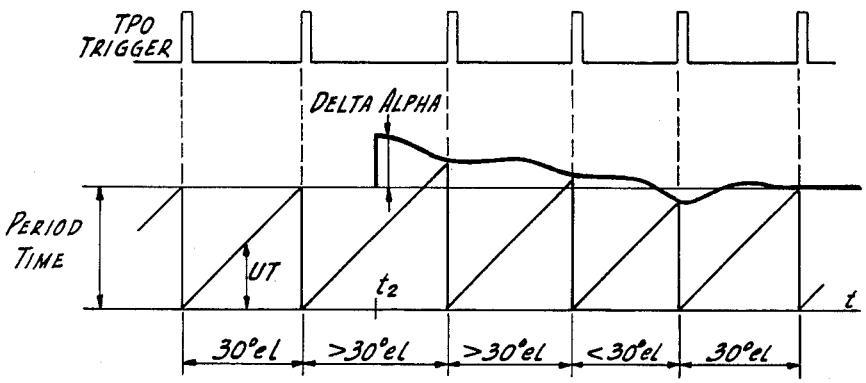
Fig. 2B
Fig. 2A
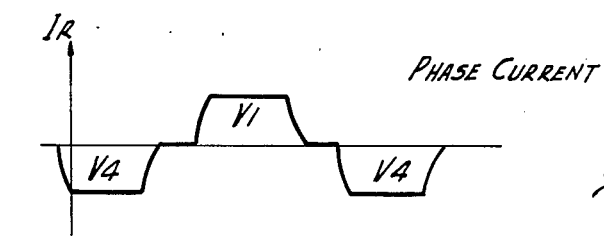
Fig. 3A
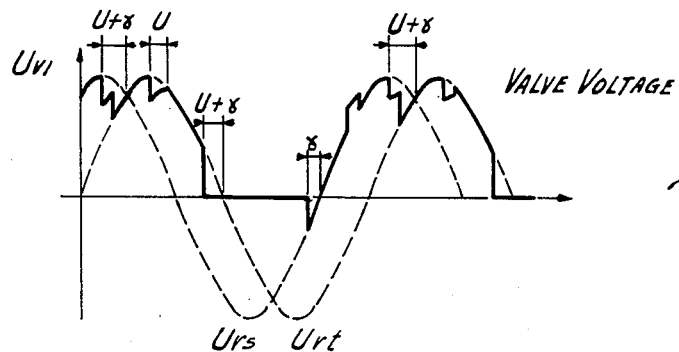
Fig. 3B
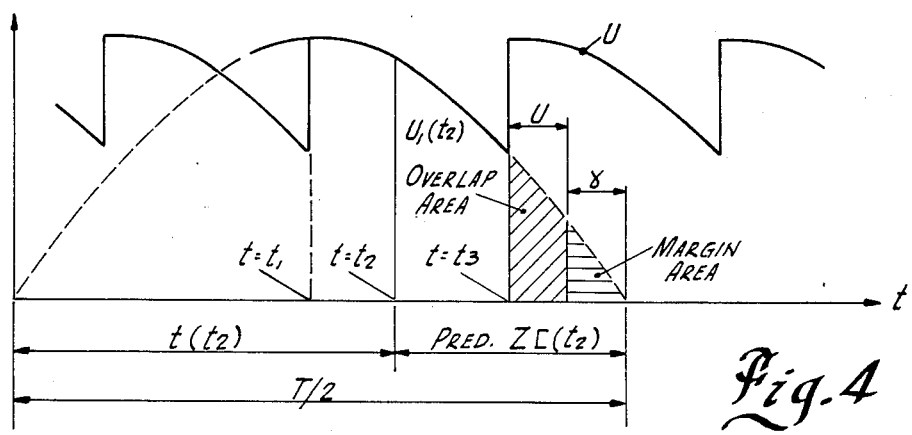
Fig. 4

INVERTER COMMUTATION FAILURE PREVENTION METHOD AND APPARATUS

BACKGROUND OF THE INVENTION

This invention relates to high voltage direct current power transmission systems and more particularly to an inverter firing control for such systems.

High voltage direct current (HVDC) power transmission systems are commonly employed for interconnecting high voltage AC networks or a distant generating station to an AC network. Such systems typically consist of two converter stations interconnected by a transmission line or cable. At the generating or transmitting end, the converter comprises a rectifier for rectifying the alternating power to direct current and voltage while at the receiving end the converter comprises an inverter which transfers power from the DC transmission line to the AC network.

A typical HVDC system may include a bipolar transmission line with the converters each comprising a pair of series connected three phase, two-way six pulse bridges which include thyristor or mercury arc valves. Such valve bridges permit the conversion of three phase alternating voltage and current to direct voltage and current or the inversion of direct voltage and current to three phase alternating voltage and current. Valves, such as thyristors, conduct current only in the forward direction from anode to cathode and only when the forward voltage across the valve is positive and the valve receives a control pulse. Once the valve has started to conduct, the magnitude of the current is determined solely by the main circuits outside the valve and is not influenced by a negative gate pulse. The flow of current through the valve continues until it decreases as a result of external influences and attempts to become negative. Reverse current flow is prevented because the valve would be reverse biased so that the current through it is extinguished. In the forward direction, the valve will block current flow until a control pulse is applied to the gate. As a result of these properties, the operating cycle of a valve is divided into a forward blocking interval, a conducting interval and a reverse blocking interval.

In a three phase, two-way twelve pulse system, each phase of the transmitting and receiving AC networks is connected to the positive and negative conductors by two pair of valves oriented in the forward direction. The valves are actuated by a firing control system which provides gate signals to the valves in a predetermined time sequence to effect current transfer or commutation from phase to phase.

When the valves are operated in the inverter mode, the direct voltage is negative when referred to current direction. This means that the voltage across the valves is positive most of the time. To establish a forward blocking voltage, the charge established during the conducting period must be removed. Therefore, the valve requires a time interval with a negative valve voltage between the end of the conducting period and the application of positive voltage. The electrical angle corresponding to this time period is called the margin of commutation or the extinction angle.

In typical inverter operation, with one valve conducting, the firing of the next succeeding valve is ordered in sufficient time before the next zero crossing, at which time the phase-to-phase voltage will become positive. Thus, the commutation from the off-going valve to the on-going valve must be finalized in time to insure a sufficient commutation margin. If for some reason commutation is not finished when the voltage across the off-going valve become positive or the commutation margin is so small that the valve does not have time to regain sufficient forward blocking capability, there is a transient disturbance in the inverter operation known as commutation failure.

As noted above, to establish the forward blocking capability of a valve, the charges established during the conduction interval are removed by providing a negative valve voltage for a time interval corresponding to the commutation time. Since rectifiers are normally operated at firing angles of less than ninety electrical degrees, this represents no problem in rectifier operation. However, such commutation failures are a concern with inverter operation because of the desirability of maintaining the extinction angle as small as possible to maximize power transfer. Conventional inverter firing angle control systems normally attempt to prevent commutation failure by measuring the time difference between the end of valve conduction and the time of the previous voltage wave form zero crossing. This permits the continous prediction of the minimum extinction angle. However, certain types of disturbances, such as single phase unbalances in the AC network, cause commutation failures to occur approximately ten milliseconds after the beginning of the disturbance. This results in a modification of the voltage wave so that information regarding previous zero crossings is no longer valid for predicting the extinction angle necessary to prevent commutation failure.

SUMMARY OF THE INVENTION

It is an object of the invention to provide a new and improved inverter control method and apparatus.

Another object of the invention is to provide an inverter control method and apparatus which provides a sufficiently rapid response to prevent commutation failures resulting from faults in the AC network.

A further object of the invention is to provide an inverter control method and apparatus which senses faults in the AC network and initiates an increase in the valve extinction angle prior to the next succeeding zero crossing of the valve voltage.

These and other objects and advantages of the present invention will become more apparent from the detailed description thereof taken with the accompanying drawings.

In general terms, one aspect of the invention comprises a control coupled to an inverter valve firing control system and including detection means coupled to the AC network for detecting an abnormal alternating voltage condition therein and for producing a deviation signal functionally related thereto. Comparison means is provided for comparing the deviation signal to a preselected value and for producing a control signal to the inverter firing control when the deviation exceeds a preselected limit. The valve firing control system is responsive to the control signal to decrease the electrical firing angle of at least one of the valves.

According to another aspect, the invention comprises a method for controlling an inverter employed for converting direct voltage and current to alternating voltage and current wherein the inverter includes a plurality of electrical valves each operable to conduct current in a single direction upon the application of a positive forward voltage and the receipt of a trigger pulse. The method comprises the steps of providing successive trigger pulses to the valves for commutating the current between successive valves at predetermined electrical firing angles, detecting an abnormal voltage condition the AC network, comparing the deviation of the sensed abnormal voltage condition with the expected voltage condition, producing a control signal when the deviation exceeds a preselected limit, sensing the occurrence of the control signal, and decreasing the electrical firing angle of at least one of the valves upon the occurrence of the control signal.

BRIEF DESCRIPTION OF THE DRAWINGS

FIG. 2A and 2B shows wave forms which illustrate the operation of the inverter firing control system of FIG. 1;

FIGS. 3A and 3B show the valve voltage and phase current during operation of a converter in the inverter mode;

FIG. 4 illustrates the operation of the inverter commutation failure prevention system in relation to commutation voltage.

DETAILED DESCRIPTION OF THE PREFERRED EMBODIMENT

Figure 1:
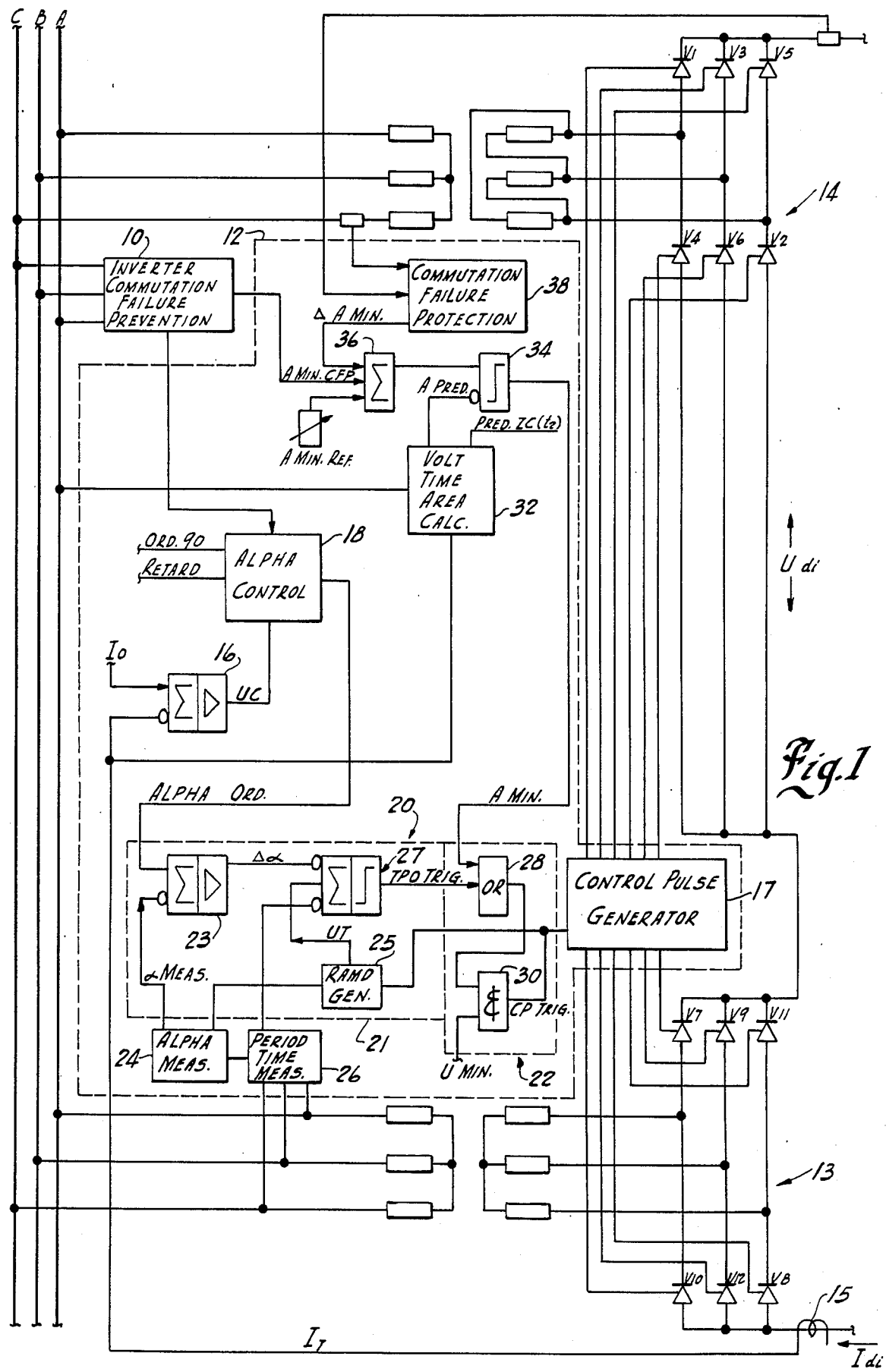
FIG. 1 schematically illustrates and inverter control system with which the commutation failure prevention system of the present invention may be employed.

The inverter commutation failure prevention system 10 of the present invention is shown, by way of example, as applied to the firing control 12 of a twelve pulse inverter. As those skilled in the art will appreciate, such inverters consist of two six-pulse bridges 13 and 14 connected in series and consisting, respectively, of valves V1–V6 and V7–V12. Each of the valves will typically comprise a thyristor which conducts only in the forward direction from anode to cathode and only when the voltage across the valve is positive and the valve receives a control pulse. The firing control 12 is known in the art and, therefore, will be described only to the extent necessary for an understanding of the invention.

In the disclosed embodiment, the primary function of the firing control 12 is to maintain the DC current Idi equal to a set current order Io even though there are variations in the DC voltage Udi. This is accomplished by comparing a feedback current signal Ir to the order current signal Io which represents the set current and is received from a higher order control (not shown). The current Ir is derived from the DC current by a DC current transformer 15. The signals Ir and Io are delivered to a current control amplifier 16 which generates a control signal UC that is related to the deviation of the current response Ir from the current order Io. This signal is employed for controlling the timing of trigger pulses from a control pulse generator 17. While the firing control 12 is shown to be operable for controlling the current Idi, those skilled in the art will appreciate that voltage control may also be employed. In the latter case, the amplifier 16 would receive a voltage order signal from a higher order control and a feedback voltage signal derived from the DC voltage Udi.

Control signal UC is provided to an alpha control block 18 which is operable to provide an output signal ALPHA ORDER to a timing pulse oscillator 20. The ALPHA ORDER signal will be the same as the UC signal unless the alpha control 18 receives an overriding signal ORD 90, RETARD or some other control signal from a higher order control (not shown). The purpose for these overriding signals is to initiate valve firings at electrical angles different from that which would occur as the result of current control and when other control actions are indicated. For example, ORD 90 would provide valve operation at ninety electrical degrees and the RETARD would provide valve operation at approximately one hundred fifty electrical degrees. For purposes of this discussion, the ALPHA ORDER signal will be under current control and related to UC or the difference between the signals Io and Ir.

The timing pulse oscillator 20 includes a phase control oscillator 21 and a triggering unit 22 and is operative to generate a pulse train CP TRIGG whose phase is determined by the signal ALPHA ORDER. The output of the pulse oscillator 20 defines the firing instant for all twelve valves in the valve bridges 13 and 14. The control pulse generator 17 separates the single input signal train CP TRIGG into twelve output control pulses of suitable length. The frequency of these output control pulses in the steady state is twelve times the fundamental frequency of the AC network.

The phase control oscillator 21 includes a first comparison circuit 23 which receives the signal ALPHA ORDER and a MEASURED ALPHA signal from an alpha measuring block 24. The alpha measure block 24 receives a first signal from a first ramp generator 25 that is reset by the firing pulses CP TRIG and includes a second ramp generator which is a part of a period time measuring circuit 26 and which is reset by the zero crossings of the phase voltages. The time between these signals is a measure of the firing angle alpha. The first comparison circuit 23 provides an output signal DELTA ALPHA to a level detector 27. Output signal DELTA ALPHA is functionally related to the difference between the ordered firing angle ALPHA ORDER and the measured firing angle ALPHA MEAS. The level detector 27 also receives a ramp signal UT from the ramp generator 25 and a period time signal from the period time measuring block 27 which is a steady state signal related to the AC voltage. When the sum of these input signals is zero as shown in FIG. 2A, an output signal TPO TRIGG is generated as seen in FIG. 2B.

FIG. 2 illustrates how DELTA ALPHA influences the firing instant. The scaling of the ramp function and the period time voltage are such that if DELTA ALPHA equals zero, that is, Ir equals Io, UT reaches PERIOD TIME exactly thirty electrical degrees after the preceding firing so that the signals TPO TRIGG are similarly spaced. Assume, however, that at time t2 there is an increase in the response current Ir so that DELTA ALPHA becomes positive. Under these conditions, firing is delayed until the sum of these signals equals zero so that the time until the next TPO TRIGG signal is greater than thirty electrical degrees. This continues until Ir again equals Io and DELTA ALPHA returns to zero and the spacing of the TPO TRIGG signals will return to thirty electrical degrees.

Referring again to FIG. 1, the signal TPO TRIGG is provided to an OR gate 28 which also receives a signal A MIN whose purpose will be discussed more fully below. The output from the OR gate 28 is provided to an AND gate 30 which also receives a preset signal U MIN. It will be appreciated that for a controlled rectifier to operate successfully, the voltage across the valve must reach a certain value before the gate pulse can be applied to produce a successful firing. The U MIN signal prevents firing until the commutation voltage has reached a preset reference level and is of importance primarily when the bridges 13 and 14 are being operated as rectifiers. In any event, the CP TRIGG signals will never be less than the present minimum established by the U MIN signal.

In order to appreciate the significance of the A MIN signal, reference is now made to FIGS. 3A and 3B. Here is shown the voltage across and the current through valve V1 when operated as an inverter with the firing angle being retarded more than ninety electrical degrees. Since the direct voltage in inverter operation is negative when referred to the current direction, the voltage across the valve is positive most of the time. To establish the full blocking capability of the valve, the charges established during the conduction period must be removed. Therefore, the valve requires a time interval with a negative voltage value between the end of the conduction period and the application of a positive voltage. The angle corresponding to this time interval is called the commutation margin or the extinction angle and is denoted as GAMMA. The commutation margin is illustrated in FIG. 4 as the remaining voltage-time area of the commutation voltage after commutation, from the end at the overlap area to the instant when the voltage across the valve changes sign, that is, from reverse to blocking voltage. This illustrates that successful commutation requires a minimum voltage-time area rather than a fixed time interval.

In existing inverter controls, the commutation margin is maintained so as to prevent commutation failure by the volt-time area calculating block 32. The volt-time area calculation block 32 is coupled to receive signals functionally related to the direct current Ir and the alternating voltage. A third input to the volt-time calculation block 32 is the signal PRED ZC(t2) received from another calculating block not forming a part of the present invention and which is present in prior art systems. It is sufficient to understand the invention to the state that the prediction is based upon the time of the last zero crossing and the voltage characteristic.

The commutation margin is indicated in FIG. 4 as the horizontally shaded margin area and is calculated by the volt-time area calculating circuit 32 from the following expression:

$$A\ PRED = K1[U1(t2)]PRED\ ZC(t2) - k2ID;$$

where:
K1 is a constant equal to 0.5;
U1(t2) is the commutation voltage at time t2;
PRED ZC(t2) is equal to the remaining time to the next zero crossing; and
K2ID is a constant times the direct current.

The constant K2 is a calibration constant which is determined from system variables. The expression PRED ZC(t2) is obtained as the difference between measured half-period time T/2 from a period time measurement subfunction and the elapsed time from the previous zero crossing of the voltage wave-form. The predicted area is the sum of the overlap area and the margin area shown in FIG. 4, with the overlap area being the excess over the minimum required for successful commutation.

The area predict signal A PRED from the volt-time area calculating block 32 is one input to a level detector 34 whose other input is the output from a summing junction 36. The input signals to the summing junction 36 comprise the output signal A MIN CFP from the inverter commutation failure prevention circuit 10; the output signal DELTA A MIN from a commutation failure protection circuit 38; and a reference signal A MIN REF.

The commutation failure protection circuit 38 is present in prior art valve firing controls systems and, therefore, need not be discussed in detail for the sake of brevity. It will be sufficient for purposes of understanding the invention to state that the block 38 receives signals functionally related to the magnitude of the DC current Idi and the AC current. Any deviation in the AC current when compared to the DC current will indicate the existence of a commutation failure. In that event, the commutation failure protection circuit will provide an output signal DELTA A MIN.

The third signal A MIN REF is a pre-set reference signal corresponding to the miniumum firing angle which will permit successful commutation. In the absence of a commutation failure or a fault in the AC system, the output from the summing junction 36 will be the A MIN REF signal. An output signal A MIN will be provided from the level detector 34 when the signal from the summing junction 36 is greater than the A PRED signal from the voltage time area calculation circuit 32.

As indicated above, the inputs to the OR gate 28 are the signals A MIN from the level detector 34 and TPO TRIGG from the phase control oscillator 21. In normal current control operation, a margin area will exist as shown in FIG. 4 so that the input signals CP TRIG to the control pulse generator 17 will be initiated by the output signals TPO TRIG from the timing pulse oscilator 20. However, should the firing angle be inadequate to maintain a sufficient voltage-time area, A MIN firing will occur, or in other words, the firing angle will be reduced so that the voltage-time between firing and the zero crossing will be increased. However, faults in the AC network can result in an instantaneous reduction of AC voltage and accordingly, in the related voltage-time area to less than that required for successful commutation. Phase shifts in the commutation voltages resulting from these disturbances can also cause zero crossings to advance which further reduces the voltage-time area. Because conventional predictive margin control cannot react quickly enough to sudden changes in the commutation voltage, these faults usually resulted in commutation failure in prior art systems. The purpose of the commutation failure prevention system 10 is to rapidly react to such AC system failures by further decreasing the firing angle thereby increasing the voltage-time area.

Figure 5:
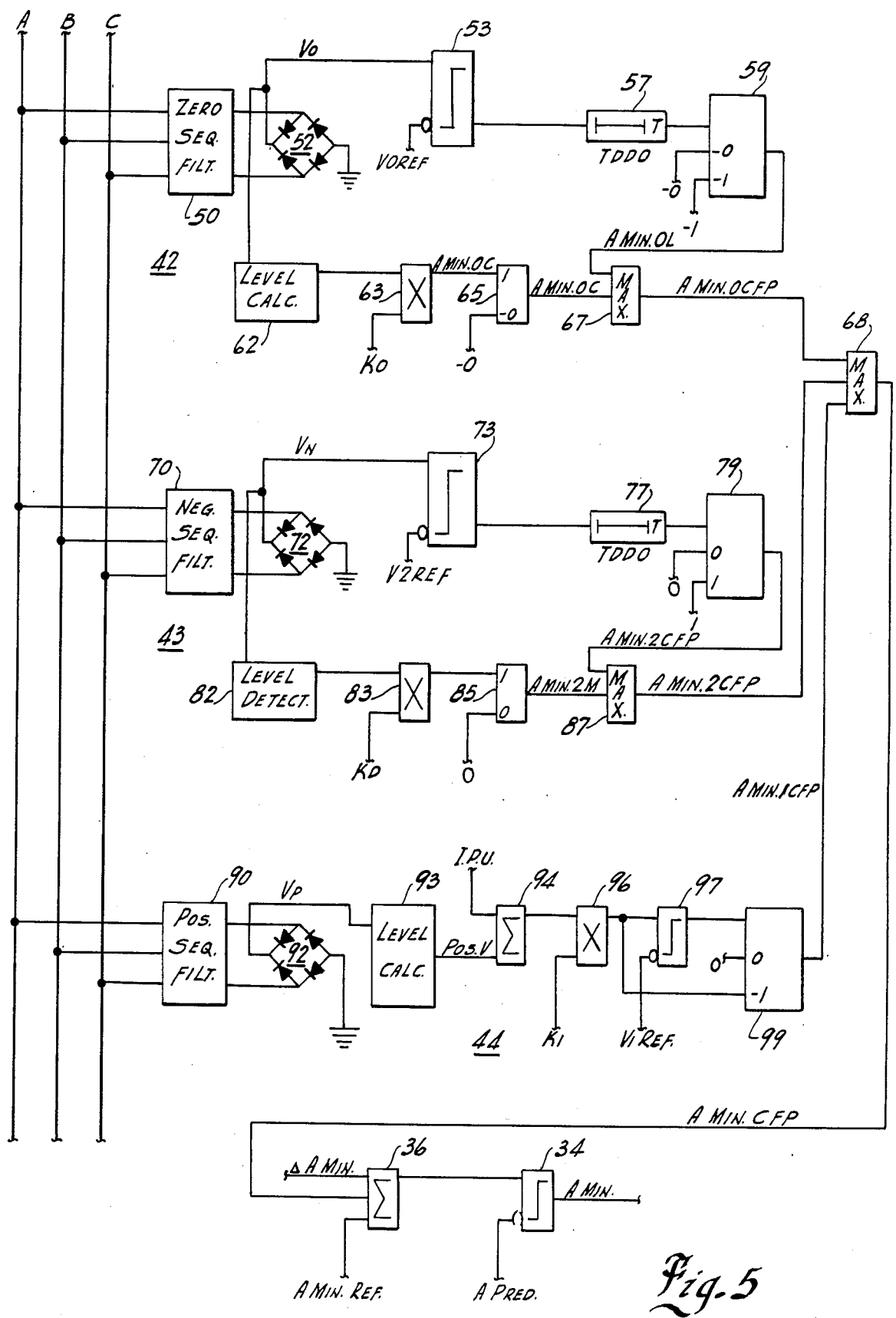
FIG. 5 schematically illustrates the commutation failure prevention system in accordance with the preferred embodiment of the invention.

The commutation failure prevention system 10 is shown in FIG. 5 to include a zero sequence section 42, a negative sequence section 43 and a positive sequence section 44. The zero sequence section 42 includes a zero sequence filter 50 coupled to the AC network ABC and to a full wave rectifier 52. The output terminals of the rectifier 52 provides a signal Vo functionally related to the zero sequence voltage. The signal Vo is provided to comparitor 53, which compares the zero sequence signal Vo to pre-set signal Vo REF. If there is a zero sequence voltage of at least a predetermined magnitude so that the input signal Vo exceeds the reference signal, an output signal will be provided to a drop out timer 57. The reference setting on the comparitor 53 is 0.1 p.u. zero sequence voltage. The drop out timer 57 is preferably constructed and arranged such that upon the receipt of an input signal it will provide an output pulse whose duration is longer than one cycle of the AC network, or about 20 milliseconds. As a result, there will be a continuous output signal to a selector 59 during AC voltage disturbances. Upon the occurrence of an output signal from the drop out timer 57, the selector 59 will switch from a zero to a pre-set output.

The zero sequence section 42 also includes an amplitude measuring circuit having a peak level calculator 62 connected to receive the rectified zero sequence voltage signal and which provides an output signal functionally related to the peak magnitude thereof. This signal is provided to a multiplier 63 which multiples the signal by a constant Ko and the product is provided as an input to a second selector 65 which will switch from a zero to the calculated input signal A MIN0C when there is an output or a logic one signal from the dropout timer 57. The output of the selectors 59 and 65 are coupled to a maximum level selector 67 which selects the greater of the two signals.

It will be appreciated that when the phase voltages in the AC system are in balance, there will be no zero sequence voltage. Under these circumstances, the output from each of the selectors 59 and 65 will be zero so that there will also be a zero output from the maximum selector 67. Upon the occurrence of an imbalance in the AC circuit, a voltage signal will appear at the output of the zero sequence filter 50. If this signal exceeds the reference Vo REF, a preselected output signal A MIN0L will be provided to the maximum signal selector 67. In addition, a second signal A MINOC will be provided to maximum selector 67 which is functionally related to the peak magnitude of the zero sequence voltage. The output of the maximum selector 67 will then be a signal A MIN OCFP which will be the greater of these input signals.

The negative sequence circuit 43 is identical to the zero sequence circuit 42 and includes a negative sequence filter 70, a full wave rectifier 72, a comparitor 73, a drop out timer 77, a first selector 79, a level detector 82, a multiplier 83, a second level detector 85, and a maximum signal selector 87. Upon the occurence of a negative sequence signal which exceeds the pre-set level V2REF, a signal A MIN2 will be provided to the maximum selector 87. If the peak negative sequence signal exceeds a predetermined level, a second signal A MIN2C will also be provided to the maximum level detector 87. The greater of these signals will then be provided as an output signal A MIN1CFP to the maximum selector 68.

The positive sequence measuring system 44 includes a positive sequence filter 90 coupled to the AC network and to a full wave rectifier 92 for providing a signal Vp functionally related to the positive sequence voltage. The signal Vp is provided to a level calculator 93 whose output is connected to a summing junction 94 for subtracting the calculated positive sequence signal POSV from a signal equal to one per unit positive sequence voltage. The difference between these signals is provided to a multiplier 96 which multiplies the remainder by a constant K1. This product, A MIN1CFP, is provided to a level detector 97 which compares this signal to a pre-set signal V1REF. If the product exceeds the reference signal V1REF, an output is provided to a selector 99. The product from multiplier 96 is also provided as the logic one input to a selector 99. Upon the occurrence of an output signal from level detector 97, selector 99 will provide an output signal A MIN1CFP to the maximum signal selector 68.

It will be appreciated that when the AC system ABC is in balance, there will be no zero sequence or negative sequence voltages. Only the occurrence of an unbalanced disturbance will result in an increase in the level of at least one of these signals. On the other hand, during balanced conditions in the AC network, a positive sequence voltage will exist. This voltage signal is subtracted from the one per unit signal in the summing junction 94. The latter signal is set for normal voltage conditions, such as, 230 KV, for example. Under normal conditions, therefore, when the positive sequence voltage would also be at a normal or one per unit level, the output from the summing junction will be zero. However, in the event of a three phase fault, in which case there may be no zero or negative sequence voltages, the positive sequence voltage will decrease resulting in an output from the summing junction 94. If the value of this difference times the constant K1, exceeds the pre-set level V1REF in the level detector 97, the selector 99 will be operated from the zero to the one condition to provide an output signal A MIN2CFP to the maximum selector 68.

Under normal balanced conditions in the AC network, the output signals from the zero sequence section 42, the negative sequence section 43 and the positive sequence section 44 would all be zero so that the output signal A MINCFP from the maximum signal selector 68 will be zero. Should a phase to ground fault occur in the AC network, for example, both zero and negative sequence voltages will result. In addition, there will be a slight reduction in the positive sequence voltage. This will result in output signals A MIN0CFP and A MIN1CFP from the zero sequence and negative sequence circuits 42 and 43. However, there will be no output signal from the positive sequence circuit 43 since the reduction and the positive sequence voltage will be less than the pre-set value V1REF. Alternatively, if there is a reduction in the voltage level in all three phases, such as upon the occurrence of a three phase fault, no zero sequence or negative sequence voltages will result. On the other hand, under the latter condition there will be a sufficient reduction in positive sequence voltage so that an output signal A MIN2CFP from the positive sequence section 43 will occur.

As indicated above, the horizontally shaded area in FIG. 4 is the minimum margin area which will result in commutation under normal conditions. This angle is called GAMMA MIN. In order to ensure that successful valve commutation occurs, the firing control pulse must be delivered to the valve at a firing angle of 180 degrees minus GAMMA MIN minus the overlap angle or less. The signal A MINREF to the summing junction 36 in FIG. 1 represents this GAMMA MIN condition. It will also be recalled that the volt-time area calculating block 32 predicts the actual voltage time area which in FIG. 4 is the sum of the margin area and the overlap area. So long as the A PRED signal exceeds the signal from summing junction 36, the signal A MIN will be zero and the firing of the valves will be under the control of the signal TPO TRIG.

The commutation failure prevention block is provided for circumstances where the alternating voltage is distorted so that the voltage-time area calculating block 32 is not able to adequately predict the voltage time area based upon prior firings. For example, because the voltage-time area calculating block 32 operates on a prediction of the zero time crossing based upon of the last crossing, it is not responsive to events which occur between zero crossings. Upon the occurence of a voltage imbalance in the AC network, the commutation failure prevention circuit adds a correction factor DELTA A MIN to the A MIN REF signal so as to increase the overlap area. On the other hand, the commutation failure protection system may only act to increase the A MIN margin after a commutation failure has occurred.

It will thus be appreciated that the inverter commutation failure prevention block 10 provides a sufficiently rapid response to prevent commutation failure resulting from faults in the AC network in respecting which other protection systems can not provide a timely response. An anaylsis of simulator tests oscilograms of commutation failures due to single phase imbalances in the AC network, for example, indicate that the commutation failures occur approximately 10 milliseconds after the beginning of the disturbance. This is sufficient time for the inverter commutation failure prevention circuit 10 to take preventive action. The zero sequence, negative sequence and positive sequence components of the three phase commutation voltage provides an instantaneous response to voltage imbalance and wave form shapes distortions to prevent commutation failure. The output signal A MINCFP from the inverter commutation failure prevention block 10 is the maximum of the sequence voltages provided to the maximum level selector 68 and will result in advancement of the valve firing angle. The settings of Vo REF; V2REF; are determined by the system parameters.

While the drawings illustrate the invention as discrete circuit components, those skilled in the art will appreciate that one or more of such components may take the form of a preprogrammed computer. Therefore, while only a single embodiment of the invention is illustrated and described, the invention is only intended to be limited by the scope of the appended claims.

I claim:

1. A control for an inverter circuit operable for converting direct voltage and current to alternating voltage and current to be transmitted to an AC network, said inverter including a plurality of electrical valves each operable to conduct current in a single direction upon the application of a forward voltage and the receipt of a trigger pulse, a first control for providing successive trigger pulses to the valves for commutating the current between successive valves at predetermined electrical firing angles, said first control including voltage-time area calculating means for maintaining the valve trigger pulse timing within the maximum permissible firing angle which will permit successful valve commutation, and an inverter commutation failure prevention means including a control means coupled to the AC network and to the first control and responsive to the existance of harmonic voltages in the AC network and for comparing the harmonic voltage to a reference voltage and for producing a control signal to the first control for reducing the electrical angles of the trigger pulses provided to the valves when the harmonic voltage deviates from the reference voltage by a predetermined extent.

2. In combination with an inverter for converting direct voltage and current to alternating voltage and current to be transmitted to an AC network, said inverter including a plurality of electrical valves each operable to conduct current in a single direction upon the application of a forward voltage and the receipt of a trigger pulse, first control means for providing successive trigger pulses to said valves commutating the current between successive valves at predetermined electrical firing angles, second control means coupled to said first control means for preventing commutation failure in said valves, said second control means including detection means coupled to the AC network for detecting the existance of a zero sequence voltage in the AC network and for producing a deviation signal functionally related thereto, comparison means for comparing the deviation signal to a reference level and for producing a control signal to the first control means when the deviation exceeds a preselected limit, the first control means being operable upon the receipt of the control signal to decrease the electrical firing angle of at least one of said valves.

3. The combination set forth in claim 2 wherein said comparison means produces a first signal, and including calculating means for calculating the level of the zero sequence voltage and for producing a second signal functionally related to the magnitude of the zero sequence voltage, and selector means for selecting the largest of said first and second signals as the control signal.

4. The combination set forth in claim 2 and including timing means coupled to the comparison means for maintaining the control signal for a time in excess of one cycle of the alternating voltage.

5. The combination setforth in claim 2 wherein said second control means includes first means for producing a first output signal upon the occurrence of a zero sequence voltage, second means for producing a second output signal upon the occurrence of a negative sequence voltage, and third means for producing a third output signal when the positive sequence voltage decreases to a predetermined level, and fourth means for selecting the maximum of the three output signals and providing the same as the control signal from the commutation failure prevention means.

6. The combination set forth in claim 2 wherein said first control means includes means coupled to the AC network for calculating the maximum electrical firing angle of the valves for successful commutation from the previous zero crossings of the alternating valve voltage and the voltage wave form and for producing a signal functionally related to the voltage time wave form area to the next zero crossing of the voltage accross the valves, and means for comparing the control signal to the voltage-time area signal and for producing a signal to the first control means if the control signal exceeds the voltage-time area signal.

7. The combination set forth in the claim 5 wherein said first control means includes means for calculating the maximum electrical firing angle of the valves for successful commutation from the previous zero crossings of the alternating voltage and the voltage wave form and for producing a signal functionally related to the voltage-time wave form area to the next zero crossing of the voltage accross the valves, and means for comparing the control signal to the voltage-time area signal and for producing a signal to the first control means if the control signal exceeds the voltage-time area signal.

8. The combination set forth in claim 2 and including means for detecting a zero sequence voltage in said AC network, said comparison means being operative to compare the deviation of the zero sequence voltage to a preselected reference level and for producing a first signal when the deviation signal exceeds the reference level, timing means coupled to the comparison means for maintaining the first signal for a time in excess of one cycle of the alternating voltage, selector means coupled to the timing means for providing an output signal during the duration of the first signal, calculating means for calculating the level of the zero sequence voltage and for producing a second signal functionally related to the magnitude thereof, and maximum selector means for selecting one of the first and second signals having the greatest magnitude, said maximum selector means providing said greatest magnitude signal as the control signal.

9. The combination set forth in claim 8 wherein said calculating means includes multiplying means for multiplying the signal functionally related to the level of the zero sequence voltage times a constant.

10. The combination set forth in claim 2 and including means for detecting a negative sequence voltage in said AC network, said comparison means comparing the deviation of the negative sequence voltage to a preselected reference level and producing a first signal when the deviation signal exceeds the reference level, timing means coupled to the comparison means for maintaining the first signal for a time in excess of one cycle of the alternating voltage, selector means coupled to the timing means for providing an output signal during the duration of the first signal, calculating means for calculating the level of the negative sequence voltage and for producing a second signal functionally related to the magnitude thereof, and maximum selector means for selecting the one of the first and second signals having the greatest magnitude, said maximum selector means providing said greatest magnitude signal as the control signal.

11. The combination set forth in claim 10 wherein said calculating means includes multiplying means for multiplying the signal functionally related to the level of the negative sequence voltage times a constant.

12. The combination set forth in claim 2 and including detection means includes first dectecting means for detecting the existence of zero sequence voltage in the AC network, first comparison means for comparing the level of the zero sequence voltage to a preselected reference voltage and for providing a zero sequence signal when the zero sequence voltage exceeds the reference level, said detection means including second detecting means for detecting the existence of a negative sequence voltage in the AC network, second comparison means operable to compare the negative sequence voltage to a reference level and for producing a negative sequence signal when the negative sequence voltage exceeds a predetermined level, said detection means including a third detecting means for detecting the positive sequence voltage in the AC network, third comparison means for comparing the positive sequence voltage to a reference level and for producing a positive sequence signal when the difference between the positive sequence voltage exceeds the reference level by a predetermined value, fourth comparison means for comparing the zero sequence signal, the negative sequence signal and the positive sequence signal and for providing a control signal related to the largest of said signals.

13. A control for a converter circuit operable for coupling direct and alternating current circuits, said converter including controlled rectifiers operable upon the delivery of trigger pulses, a first control means for providing successive trigger pulses to the controlled rectifiers at predetermined electrical firing angles, second control means coupled to the alternating current circuit and to the first control means for detecting the existence of a zero sequence voltage in the alternating current circuit and for providing a control signal to the first control means upon the occurrence of a zero sequence voltage, the first control means being operable upon the receipt of the control signal to decrease the firing angle of said controlled rectifiers.

14. The combination set forth in claim 13 wherein said second control means includes comparison means for comparing the magnitude of the zero sequence voltage in the alternating current circuit to a predetermined reference level and for producing the control signal when the zero sequence voltage level exceeds the reference level by a predetermined magnitude.

15. The combination set forth in claim 14 and including timing means coupled to the comparison means for maintaining the control signal for a time at least equal to one cycle of the alternating voltage in the alternating current circuit.

16. The combination set forth in claim 15 and including level determining means for determining the level of the zero sequence voltage and for producing a second signal functionally related to the magnitude of the zero sequence voltage, and selector means for selecting largest of said second and control signals as an output control signal, said first circuit means being operable upon the receipt of the output control signal to decrease the firing angle of the controlled rectifiers to a greater extent when said second signal exceeds said first control signal.

17. The combination set forth in claim 16 wherein said first control means includes means coupled to the alternating current circuit for determining the maximum electrical firing angle of the controlled rectifiers for successful commutation from the previous zero crossings of the alternating controlled voltage and the voltage wave form and for producing a time-area signal functionally related to the voltage-time wave form area to the next zero crossing of the voltage accross the controlled rectifiers, and comparison means for comparing the output control signal to the voltage-time area signal, said first control means being operable to decrease the firing angles of the controlled recitifiers when the output control signal exceeds the voltage-time area signal.

18. In a method of controlling an inverter bridge which is operable for transferring power from a direct current circuit to an alternating current network, said inverter including a plurality of electrical valves each operable to conduct current in a single direction upon the application of a forward voltage and the receipt of a trigger pulse, the method comprising the steps of: providing successive trigger pulses to said valves for commutating the current between successive valves at predetermined electrical firing angles, detecting the existence of harmonic voltages in the alternating current network, comparing the harmonic voltages to a reference voltage, producing a control signal when the deviation of the harmonic voltage from the reference voltage exceeds a preselected limit, sensing the occurrence of the control signal and decreasing the electrical firing angle of at least one of said valves upon the occurrence of the control signal.

19. The method set forth in claim 18 wherein the harmonic voltage is a zero sequence voltage in the alternating current network, comparing the level of the zero sequence voltage to a preselected reference level and generating a zero sequence control signal having a predetermined time interval upon the occurrence of a zero sequence signal having a preselected magnitude, sensing the occurrence of the zero sequence control signal and decreasing the electrical firing angle of at least one of said valves upon the occurrence of the zero sequence control signal.

20. The method set forth in claim 19 and including the step of maintaining the zero sequence control signal for a time interval of at least one cycle of the alternating voltage in the alternating current network.

21. The method set forth in claim 20 and including the step of determining the level of the zero sequence voltage, producing a second zero sequence control signal functionally related to the magnitude of the zero sequence voltage, and selecting the maximum of the first and second zero sequence control signals as the output control signal, and further decreasing the electrical firing angle of at least one of said valves when the second zero sequence control signal exceeds the first zero sequence control signal.

22. The method set forth in claim 18 and including the steps of determining the maximum electrical firing angle of the valves for successful commutation from the previous zero crossings of the alternating valve voltage and the valve voltage wave form and producing a voltage-time signal functionally related to the voltage time wave form to the next zero crossing of the voltage across the valves, comparing the control signal to the voltage-time signal, and producing a control signal to the first control means if the control signal exceeds the voltage-time signal.

23. The method set forth in claim 21 and including the steps of determining the maximum electrical firing angle of the valves for successful commutation from the previous zero crossings of the alternating valve voltage and the voltage wave form and producing a signal functionally related to the voltage-time wave form to the next zero crossing of the voltage across the valves, comparing the zero sequence output control signal to the voltage-time signal and producing a control signal to the first control means if the zero sequence control signal exceeds the voltage-time signal.

24. The method set forth in claim 18 and including the steps of detecting the existence of a negative sequence voltage in the alternating current network, comparing the negative sequence voltage to a reference level, and producing said control signal when the negative sequence signal exceeds the reference level.

25. The method set forth in claim 21 and including the steps of detecting the existence of a negative sequence voltage in the alternating current network, comparing the negative sequence voltage to a reference level, and producing a negative sequence control signal when the negative sequence voltage exceeds the reference level, comparing the output control signal to the negative sequence control signal and further decreasing the valve electrical firing angle when said negative sequence control signal exceeds the output control signal.

26. The method set forth in claim 18 and including the steps of detecting the level of the positive sequence voltage in the alternating current network, comparing the positive sequence voltage to a reference level, producing a positive sequence output control signal when the positive sequence signal level exceeds the reference level.

27. The method set forth in claim 25 and including the steps of detecting the level of the positive sequence voltage in the alternating current network, comparing the positive sequence voltage level to a reference level, producing a positive sequence control signal when the positive sequence signal level exceeds the reference level, comparing the positive sequence control signal to the negative sequence control signal and the output control signal and further decreasing the electrical firing angle when the positive sequence control signal exceeds the negative sequence control signal and the output control signal.

28. The method set forth in claim 18 and including the steps determining the level of the positive sequence voltage in the alternating current network, subtracting the calculated positive sequence voltage from an expected level of positive sequence voltage under normal conditions, multiplying the difference times a constant, comparing the product to a reference level, and producing a output signal functionally related to said product when said product exceeds the reference level.

29. The method set forth in claim 18 and including the steps of generating an electrical signal functionally related to the zero sequence voltage in the alternating current network, comparing the generated signal to a reference voltage signal and producing a first signal when the generated signal exceeds the reference signal, extending the duration of the first signal for time at least equal to one cycle of the alternating voltage in the alternating current network, producing a first output signal during the duration of the extended signal, determining the level of the zero sequence voltage in the alternating current network, multiplying the determined zero sequence voltage times a constant, generating a second output signal functionally related to the product, comparing the first and second output signals, and producing a control signal which is a function of the maximum of the first and second output signals.

30. The method set forth in claim 29 and including the steps of determining the level of the positive sequence voltage in the alternating current network, subtracting the calculated positive sequence voltage from an expected level of positive sequence voltage under normal conditions, multiplying the difference times a constant, comparing the product to a reference level, and producing a second control signal functionally related to said product when said product exceeds reference level, and sensing the greater of said control signal and said second control signal and decreasing the electrical firing angle in relation to the greater of said signals.

31. The method set forth in claim 18 and including the steps of generating an electrical signal functionally related to the negative sequence voltage in the alternating current network, comparing the generated signal to a reference voltage signal and producing a first signal when the generated signal exceeds the reference signal, extending the duration of the first signal for a time at least equal to one cycle of the alternating voltage in the alternating current network, producing a first output signal during the duration of the extended signal, determining the level of the negative sequence voltage in the alternating current network, multiplying the calculated voltage times a constant, and generating a second output signal functionally related to the product, comparing the first and second output signals and producing a control signal which is the maximum of the first and second output signals.

32. The method set forth in claim 29 and including the steps of generating an electrical signal functionally related to the negative sequence voltage in the alternating current network, comparing the generated signal to a reference voltage signal and producing a second signal when the generated signal exceeds the reference signal, extending the duration of the second signal for a time at least equal to one cycle of the alternating voltage in the alternating current network, producing a third output signal during the duration of the extended signal, determining the level of the negative sequence voltage in the alternating current network, multiplying the calculated voltage times a constant, generating a fourth output signal functionally related to the product, comparing the third and fourth output signals and producing a third control signal which is the maximum of the third and fourth output signals, selecting the greater of said control signal, said second control signal and said third control signal and decreasing said electrical firing angle in relation to the greater of said control signals.

33. The method set forth in claim 18 and including the steps of detecting the existence of zero sequence voltage in the alternating current network, comparing the level of the zero sequence voltage to a preselected reference voltage, generating a zero sequence signal when the zero sequence voltage exceeds the reference level, detecting the existence of a negative sequence voltage in the alternating current network, comparing the negative sequence voltage to a reference level, generating a negative sequence signal when the negative sequence voltage exceeds a predetermined level, detecting the level of the positive sequence voltage in the alternating current network, comparing the positive sequence voltage level to a reference level, generating a positive sequence signal when the difference between the positive sequence voltage level and the reference level exceeds a predetermined value, comparing the zero sequence signal, the negative sequence signal and the positive sequence signal, and generating an output signal related to the largest of said signals.

34. In a method of controlling an inverter bridge which is operable for transferring power from a direct current circuit to an alternating current network, said inverter including at least one electrical valve operable upon the application of a trigger pulse, the method comprising the steps of: providing successive trigger pulses to said valve at predetermined electrical firing angles for successively operating said valve to conduct current, detecting the existence of harmonic voltages in the alternating current network, comparing the harmonic voltage to a reference voltage, producing a control signal when the deviation of the harmonic voltage from the reference voltage exceeds a preselected limit, sensing the occurrence of the control signal and decreasing the electrical firing angle of said valve upon the occurrence of the control signal.

35. The method set forth in claim 34 wherein the harmonic voltage is a zero sequence voltage in the alternating current network, comparing the level of the zero sequence voltage to a preselected reference level, generating a zero sequence control signal having a predetermined time interval upon the occurrence of a zero sequence signal having a preselected magnitude, sensing the occurrence of the zero sequence control signal, and decreasing the electrical firing angle of said valve upon the occurrence of the zero sequence control signal.

36. The method set forth in claim 35 and including the step of maintaining the zero sequence control signal for a time interval at least equal to one cycle of the alternating voltage in the alternating current network.

37. The method set forth in claim 36 and including the step of calculating the level of the zero sequence voltage, producing a second zero sequence control signal functionally related to the magnitude of the zero sequence voltage, and selecting the maximum of the first and second zero sequence control signals as the output control signal, and further decreasing the electrical firing angle of at least one of said valves when the second zero sequence control signal exceeds the first zero sequence control signal.

38. The method set forth in claim 37 and including the steps of calculating the maximum electrical firing angle of the valve for successful operation from the previous zero crossings of the alternating valve voltage and the valve voltage wave form and producing a voltage-time signal functionally related to the voltage time wave form to the next zero crossing of the voltage across the valve, comparing the zero sequence control signal to the voltage-time signal, and producing a control signal to the first control means if the zero sequence control signal exceeds the voltage time area signal.

39. In combination with an inverter for converting direct voltage and current to alternating voltage and current to be transmitted to an AC network, said inverter including at least one electrical valve operable to conduct current in a single direction upon the application of a forward voltage and the receipt of a trigger pulse, first control means for providing successive trigger pulses to said valve for commutating the current at predetermined electrical firing angles, second control means coupled to said first control means for preventing commutation failure in said valves, said second control means including detection means coupled to the AC network for detecting a zero sequence voltage in the AC network and for producing a deviation signal functionally related thereto, comparison means for comparing the deviation signal to a preselected value and for producing a control signal to the first control means when the deviation exceeds a preselected limit, the first control means being operable upon the receipt of the control signal to decrease the electrical firing angle of said valve.

40. In combination with an inverter for converting direct voltage and current to alternating voltage and current to be transmitted to an AC network, said inverter including a plurality of electrical valves each operable to conduct current in a single direction upon the application of a forward voltage and the receipt of a trigger pulse, first control means for providing successive trigger pulses to said valves for commutating the current between successive valves at predetermined electrical firing angles, second control means coupled to said first control means for preventing commutation failure in said valves, said second control means including detection means coupled to the AC network for detecting the existance of a negative sequence voltage in the AC network and for producing a deviation signal functionally related thereto, comparison means for comparing the deviation signal to a reference level and for producing a control signal to the first control means when the deviation exceeds a preselected limit, the first control means being operable upon the receipt of the control signal to decrease the electrical firing angle of at least one of said valves.

41. In combination with an inverter for converting direct voltage and current to alternating voltage and current to be transmitted to an AC network, said inverter including a plurality of electrical valves each operable to conduct current in a single direction upon the application of a forward voltage and the receipt of a trigger pulse, first control means for providing successive trigger pulses to said valves for commutating the current between successive valves at predetermined electrical firing angles, second control means coupled to said first control means for preventing commutation failure in said valves, said second control means including detection means coupled to the AC network for detecting the existance of a positive sequence voltage in the AC network and for producing a deviation signal functionally related thereto, comparison means for comparing the deviation signal to a reference level and for producing a control signal to the first control means when the deviation exceeds a preselected limit, the first control means being operable upon the receipt of the control signal to decrease the electrical firing angle of at least one of said valves.

42. The combination set fourth in claim 41 and including arithmatic means for subtracting the calculated positive sequence voltage from the expected positive sequence voltage and multiplying the remainder times a constant and for producing a control signal when the products exceeds a preference level.

* * * * *